June 16, 1964 H. W. BUDENBENDER 3,137,120
CABLE FABRICATION
Filed May 22, 1963
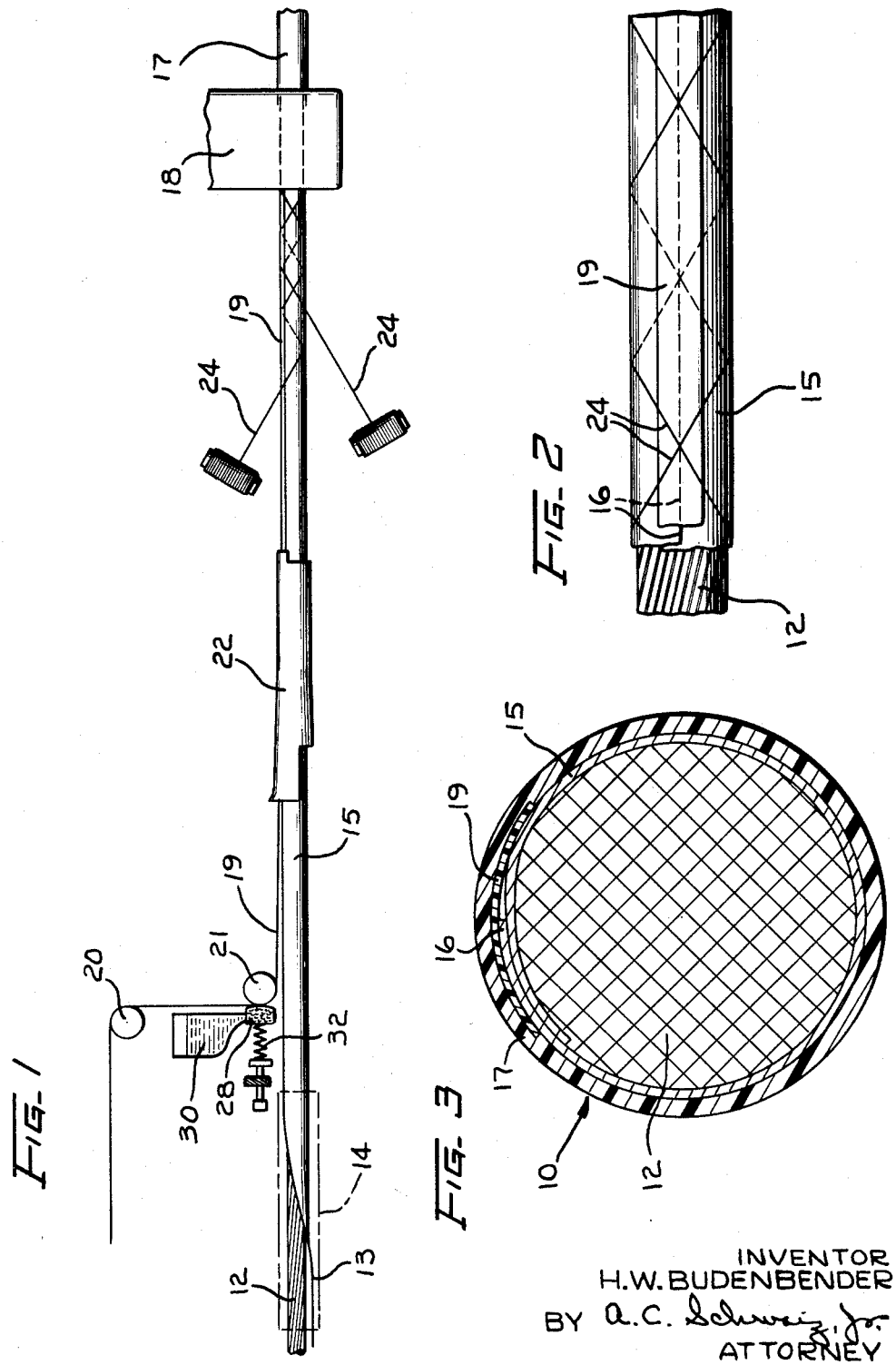
INVENTOR
H.W. BUDENBENDER
BY A.C. Schweig, Jr.
ATTORNEY

3,137,120
CABLE FABRICATION

Henry W. Budenbender, Cicero, Ill., assignor to Western Electric Company, Incorporated, New York, N.Y., a corporation of New York
Filed May 22, 1963, Ser. No. 282,388
3 Claims. (Cl. 57—162)

This invention relates to cable fabrication, and more particularly to the fabrication of metal sheathed cable.

In the fabrication of one type of cable of relatively small diameter, a flat strip of metal such as aluminum, is formed progressively around the cable core into a tube with one edge of the tube overlapping the other, a thin tape of thermo-plastic resin such as acetate is laid over the seam of the metal tube and is held thereagainst by helically winding two binding strands therearound in opposite directions, after which a protective sheath of thermo-plastic resin such as polyethylene is applied thereto. It has been found that marginal portions of the seam covering strip tend to curl outwardly between the binding strands prior to the application of the outer thermo-plastic sheath and thus reduce the wall thickness of and weaken the outer sheath at such locations.

An object of the invention is to provide an improved method of fabricating metal sheathed cable.

A method of fabricating cable illustrating certain aspects of the invention may include progressively forming a strip of metal around successive portions of a cable core to form a metal tube therefor with one edge of the metal tube overlapping the other, applying a film of oil to one side of a tape of thermo-plastic resin such as acetate, applying successive portions of the tape onto the metal tube to cover the seam thereof and with the oiled face of the tape in engagement with the metal tube to cause the marginal portions of the tape to adhere to the tube, helically winding binding strands around the tape and the metal tube, and extruding thereonto a sheath of thermo-plastic resin such as polyethylene.

Other objects, advantages and novel aspects of the invention will become apparent upon consideration of the following detailed description, in conjunction with the accompanying drawings, in which:

FIG. 1 is a fragmentary diagrammatic view showing the fabrication of the cable;

FIG. 2 is an enlarged fragmentary plan view of the metal sheathed cable core after the seam covering tape has been bound thereto; and FIG. 3 is an enlarged cross-sectional view of the cable.

In the fabrication of a cable 10 a cable core 12 consisting of a plurality of insulated conductors is withdrawn from a supply thereof and advanced along a predetermined path by a take-up reel (not shown). A flat thin strip 13 of metal such as aluminum or steel from a suitable supply thereof is progressively formed around the cable core 12 by suitable forming member 14 to provide a metal tube or sheath 15 therefor with a longitudinal edge 16 of the tube overlying the other (FIG. 3) to form a longitudinal seam on the upper portion of the tube. A protective outer sheath 17 of thermoplastic resin such as polyethylene is subsequently extruded around the metal tube 15 by an extruder 18.

Inasmuch as the polyethylene material is relatively expensive it is desirable to apply the sheath of such material onto the metal tube so as to have a uniform wall thickness and of a minimum dimension commensurate with the degree of protection required of it. It is also essential to avoid the use of anything that would reduce the effective thickness of portions of the outer sheath of thermoplastic material. In order to prevent the overlying edge 16 of the metal tube 15 from projecting into and weakening the outer thermo-plastic sheath 17, a relatively thin tape 19 of thermo-plastic resin such as acetate is applied to the overlapping edge 16 of the metal tube 15. The tape 19 from a suitable supply thereof is advanced over guide rollers 20, 21 into a tubular forming member 22 and is transversely reshaped thereby and directed onto the metal tube 15 in overlapping and aligned relation to the seam thereof.

As the seam-covering tape 19 emerges from the forming member 22 a pair of binding strands 24 are spirally wrapped around the tape and the metal tube 15 in opposite directions to hold the tape 19 in position on the tube 15. As shown in FIG. 2, the binding strands 24 engage the edge portions of the tape 18 at longitudinally spaced points thereof.

A film of oil is applied to the side of the tape 19 that contacts the metal tube 15 to cause the marginal portions of the tape to adhere to the metal tube 15. This prevents the longitudinal edge portions of the tape 19 extending between the binding strands 24 from turning outwardly or otherwise separating from the metal tube 15 and thereby weakening the outer sheath 17 subsequently applied thereto. The film of oil is applied to this tape 19 by an oil saturated felt pad 28 which is supported adjacent the guide roller 21. Oil is fed to the pad from an oil supply in a container 30 mounted above the pad. Pressure is applied to the pad 28 by a suitable adjustable pressure device shown herein as a spring 32 to maintain the pad in engagement with the tape 18 for the transfer of the film of oil thereto and for pressing the tape against the roller 21 to apply tension to the tape to insure the application of the tape without the formation of wrinkles onto the metal tube 15 preparatory to the binding of the tape 19 and the extrusion of the sheath 17 thereonto. The oil which is applied to the tape 19 is a paraffinic base petroleum lubricating oil free of inhibitors.

While one specific embodiment of the invention has been described in detail hereinabove, it will be obvious that various modifications may be made without departing from the spirit and scope of the invention.

What is claimed is:

1. The method of fabricating a cable which comprises:
    forming a strip of metal around a cable core into a metal tube with one edge of the metal tube overlapping the other to form a seam;
    applying a film of oil to one side of a tape of thermo-plastic resin;
    applying successive portions of the tape onto the metal tube to cover the seam thereof and with the oiled face of the tape in engagement with the metal tube;
    helically winding a binding strand around the tape and the metal tube; and
    extruding a sheath of thermo-plastic resin onto the metal tube and the tape.

2. The method of fabricating a cable which comprises:
    progressively forming a strip of metal around successive portions of a cable core into a metal tube with one edge of the metal tube overlapping the other to form a seam;

applying a film of oil to one side of a tape of acetate;
applying successive portions of the tape onto the metal tube to cover the seam of the tube and with the oiled face of the tape in engagement with the metal tube;
helically winding a binding strand around the tape and the metal tube; and
extruding a sheath of polyethylene onto the metal tube and the tape.

3. The method as defined in claim 2 wherein the oil is a paraffinic base petroleum lubricating oil free of inhibitors.

References Cited in the file of this patent

UNITED STATES PATENTS

| | | |
|---|---|---|
| 2,343,747 | Chernack | Mar. 7, 1944 |
| 2,427,507 | Powell, 3d, et al. | Sept. 16, 1947 |
| 2,459,877 | Gillis | Jan. 25, 1949 |
| 2,797,731 | Carlson | July 2, 1957 |
| 3,066,721 | Levy | Dec. 4, 1962 |
| 3,087,007 | Jachimowicz | Apr. 23, 1963 |